(12) United States Patent
Barrett et al.

(10) Patent No.: US 12,425,444 B2
(45) Date of Patent: Sep. 23, 2025

(54) SYSTEM AND METHOD FOR APPLYING SECURITY MITIGATION TO COMPONENTS WITHIN A STORAGE SYSTEM

(71) Applicant: Dell Products L.P., Round Rock, TX (US)

(72) Inventors: Kevin Drew Barrett, Shrewsbury, MA (US); Jochen Frans Jozef De Smet, Shrewsbury, MA (US); Brandon Myers, Durham, NC (US); Benjamin Kelley, Sturbridge, MA (US)

(73) Assignee: Dell Products L.P., Round Rock, TX (US)

( * ) Notice: Subject to any disclaimer, the term of this patent is extended or adjusted under 35 U.S.C. 154(b) by 159 days.

(21) Appl. No.: 18/486,215

(22) Filed: Oct. 13, 2023

(65) Prior Publication Data

US 2025/0126146 A1 Apr. 17, 2025

(51) Int. Cl.
*H04L 9/40* (2022.01)
(52) U.S. Cl.
CPC .............................. *H04L 63/1441* (2013.01)

(58) Field of Classification Search
CPC ... H04L 63/1441; G06F 21/60; G06F 3/0623; G06F 3/0632; G06F 3/0634; G06F 3/067
See application file for complete search history.

(56) References Cited

U.S. PATENT DOCUMENTS

| | | | |
|---|---|---|---|
| 2016/0342532 A1* | 11/2016 | Peacock | G06F 12/0868 |
| 2020/0387430 A1* | 12/2020 | Hironaka | G06F 11/1469 |
| 2023/0141909 A1* | 5/2023 | Truscott | H04L 63/02 726/23 |

* cited by examiner

*Primary Examiner* — Olugbenga O Idowu
(74) *Attorney, Agent, or Firm* — Brian J. Colandreo; Heath M. Sargeant; Holland & Knight LLP

(57) ABSTRACT

A method, computer program product, and computing system for processing a request to enable a secure mode on a storage system. A secure mode flag on each node of the storage system is set. A first storage node of the storage system is rebooted. The secure mode flag on the first storage node is processed. In response to processing the secure mode flag, a secure container is selected from a local image repository on the first storage node and the first storage node is initialized in the secure mode using the selected secure container.

20 Claims, 5 Drawing Sheets

SYSTEM AND METHOD FOR APPLYING SECURITY MITIGATION TO COMPONENTS WITHIN A STORAGE SYSTEM

BACKGROUND

The Defense Information Systems Agency (DISA) is responsible for maintaining the security posture of the Department of Defense (DoD) IT infrastructure. DISA creates Security Requirement Guides (SRGs) and "STIGs"—Security Technical Implementation Guides. These requirements encompass two areas—policy requirements for security programs and best practices for Information Assurance (IA)-enabled applications. STIGs are essentially alternate configurations that make commonly used applications more secure. All DoD IT assets must meet STIG compliance in some fashion before they are allowed to operate on DoD networks. Changing the configurations in compliance with the STIG requirements, often referred to as STIG hardening, allows a product to meet the unique requirements of the DoD market. A specific product will have a set of STIGs applicable depending on the functional components that are present, such as operating system, network stack and web server implementations. Application of the mitigations to meet the STIGs raises the security posture of the components in the product to meet the relevant security requirements.

Conventional approaches to managing these different levels of security include producing multiple code bases increasing cost and complexity in producing and managing multiple manufacturing and support activities. Alternatively, the use of inefficient or clumsy tools to apply these changes to an active system, brings an increased chance of the system being left in a degraded state during or after the process.

SUMMARY OF DISCLOSURE

In one example implementation, a computer-implemented method executed on a computing device may include, but is not limited to, processing a request to enable a secure mode on a storage system. A secure mode flag on each node of the storage system is set. A first storage node of the storage system is rebooted. The secure mode flag on the first storage node is processed. In response to processing the secure mode flag, a secure container is selected from a local image repository on the first storage node and the first storage node is initialized in the secure mode using the selected secure container.

One or more of the following example features may be included. The secure mode is defined by a Security Technical Implementation Guide (STIG). The local image repository on the first storage node includes a default configuration corresponding to a default mode. Selecting the secure container from the local image repository on the first storage node includes selecting a predefined secure container slice corresponding to the secure mode. The storage system is a multi-node storage system including the first storage node and at least a second storage node. In response to initializing the first storage node in the secure mode: the second storage node of the storage system is rebooted, the secure mode flag set on the second storage node may be processed; in response to processing the secure mode flag, a secure container may be selected from a local image repository on the second storage node; and the second storage node may be initialized in the secure mode using the selected secure container. In response to initializing the second storage node in the secure mode, the rebooting, processing, selecting, and initializing is sequentially repeated for each additional node in the storage system.

In another example implementation, a computer program product resides on a computer readable medium that has a plurality of instructions stored on it. When executed by a processor, the instructions cause the processor to perform operations that may include, but are not limited to, processing a request to enable a secure mode on a storage system. A secure mode flag on each node of the storage system is set. A first storage node of the storage system is rebooted. The secure mode flag on the first storage node is processed. In response to processing the secure mode flag, a secure container is selected from a local image repository on the first storage node and the first storage node is initialized in the secure mode using the selected secure container.

One or more of the following example features may be included. The secure mode is defined by a Security Technical Implementation Guide (STIG). The local image repository on the first storage node includes a default configuration corresponding to a default mode. Selecting the secure container from the local image repository on the first storage node includes selecting a predefined secure container slice corresponding to the secure mode. The storage system is a multi-node storage system including the first storage node and at least a second storage node. In response to initializing the first storage node in the secure mode: the second storage node of the storage system is rebooted, the secure mode flag set on the second storage node may be processed; in response to processing the secure mode flag, a secure container may be selected from a local image repository on the second storage node; and the second storage node may be initialized in the secure mode using the selected secure container. In response to initializing the second storage node in the secure mode, the rebooting, processing, selecting, and initializing is sequentially repeated for each additional node in the storage system.

In another example implementation, a computing system includes at least one processor and at least one memory architecture coupled with the at least one processor, wherein the at least one processor configured to process a request to enable a secure mode on a storage system. A secure mode flag on each node of the storage system is set. A first storage node of the storage system is rebooted. The secure mode flag on the first storage node is processed. In response to processing the secure mode flag, a secure container is selected from a local image repository on the first storage node and the first storage node is initialized in the secure mode using the selected secure container.

One or more of the following example features may be included. The secure mode is defined by a Security Technical Implementation Guide (STIG). The local image repository on the first storage node includes a default configuration corresponding to a default mode. Selecting the secure container from the local image repository on the first storage node includes selecting a predefined secure container slice corresponding to the secure mode. The storage system is a multi-node storage system including the first storage node and at least a second storage node. In response to initializing the first storage node in the secure mode: the second storage node of the storage system is rebooted, the secure mode flag set on the second storage node may be processed; in response to processing the secure mode flag, a secure container may be selected from a local image repository on the second storage node; and the second storage node may be initialized in the secure mode using the selected secure configuration. In response to initializing the second storage node in the secure mode, the rebooting, processing, selecting, and initializing is sequentially repeated for each additional node in the storage system.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
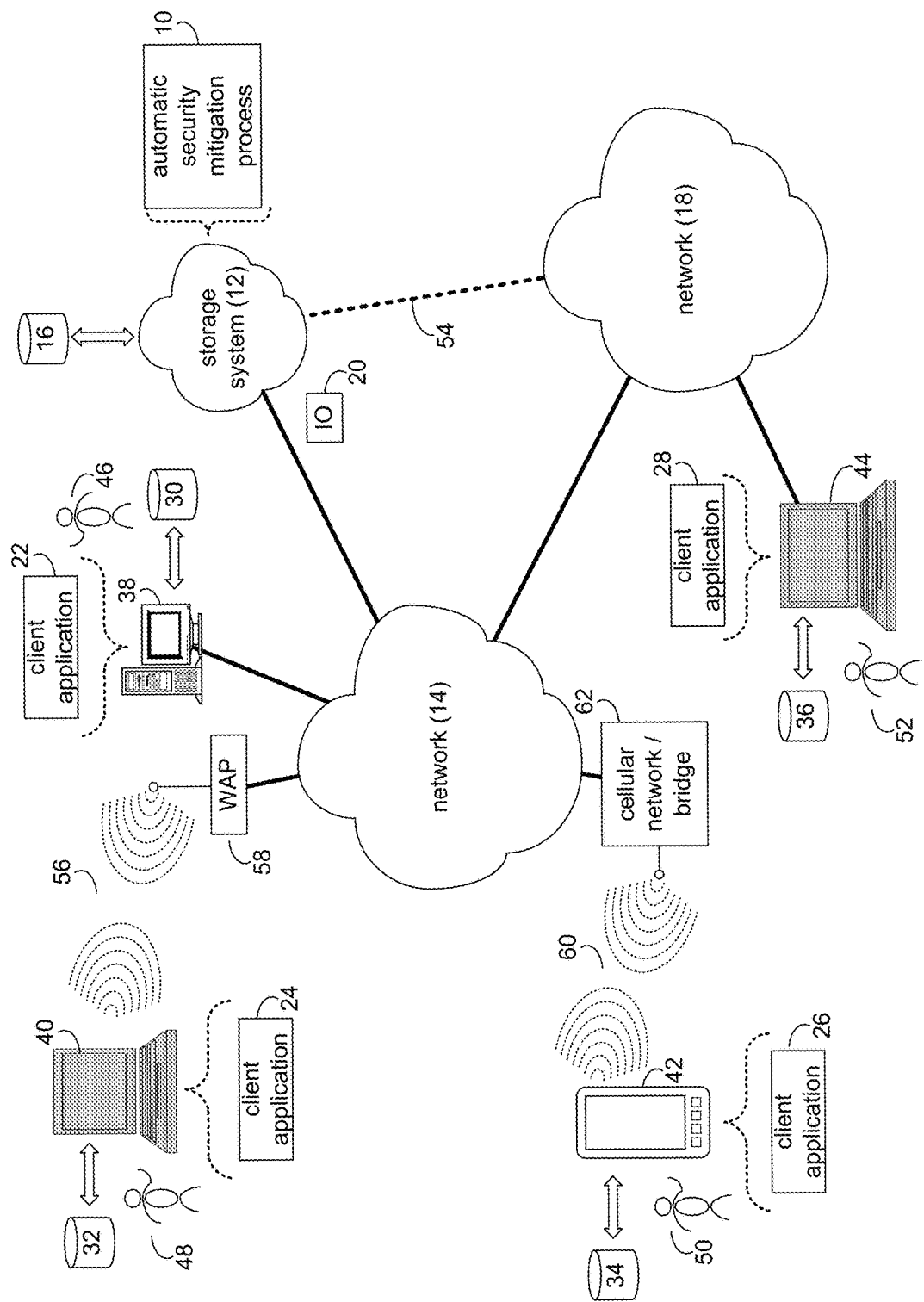
FIG. 1 is an example diagrammatic view of a storage system and an automatic security mitigation process coupled to a distributed computing network according to one or more example implementations of the disclosure.

Referring to FIG. 1, there is shown automatic security mitigation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of automatic security mitigation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of automatic security mitigation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data replication process, such as automatic security mitigation process 10 of FIG. 1, may include but is not limited to, processing a request to enable a secure mode on a storage system. A secure mode flag on each node of the storage system is set. A first storage node of the storage system is rebooted. The secure mode flag on the first storage node is processed. In response to processing the secure mode flag, a secure container is selected from a local image repository on the first storage node and the first storage node is initialized in the secure mode using the selected secure container.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
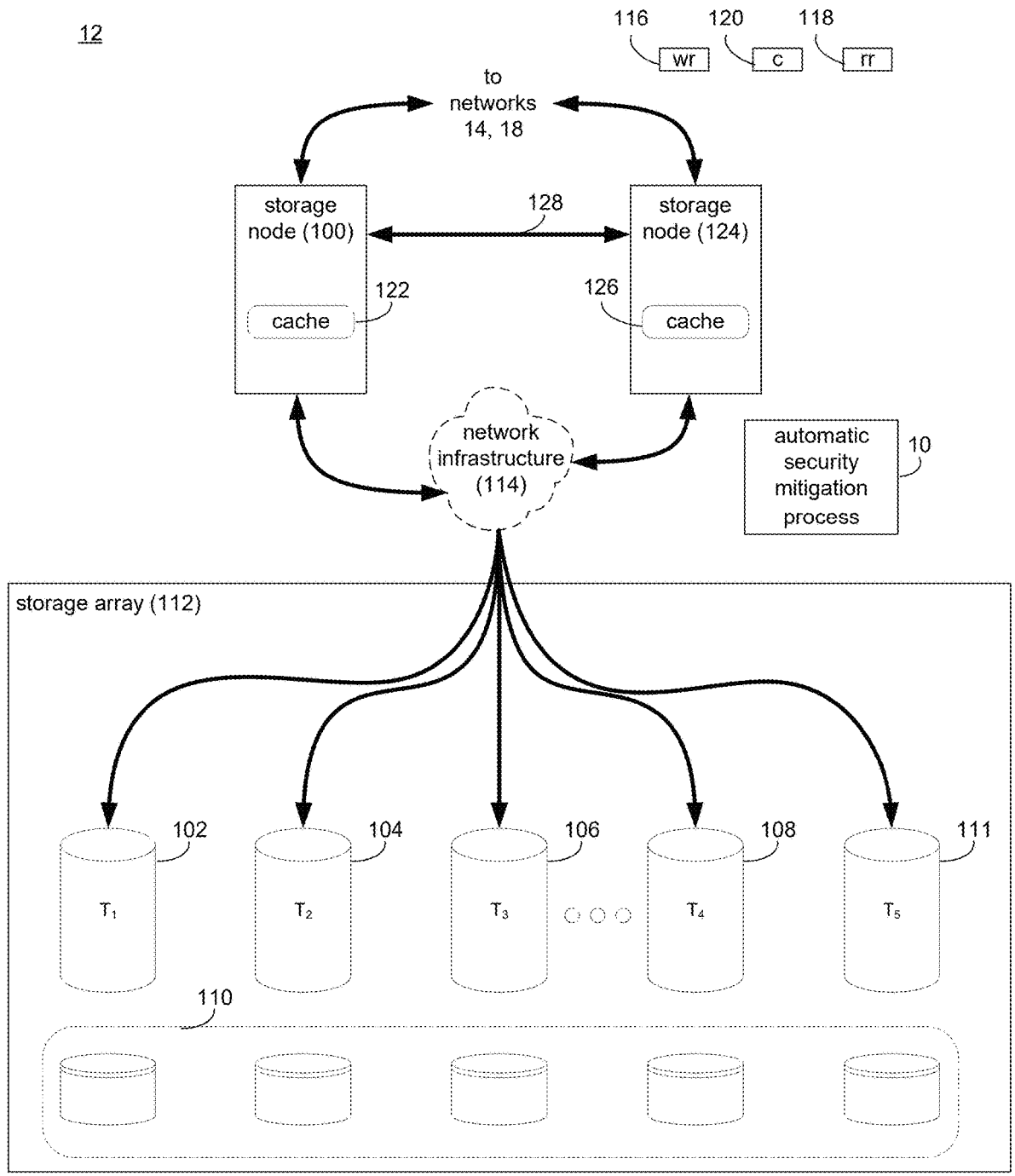
FIG. 2 is an example diagrammatic view of the storage system of FIG. 1 according to one or more example implementations of the disclosure.

Referring also to FIG. 2, storage system 12 may include storage node 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g., the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g., the level of redundancy/performance/capacity required. For example, storage system 12 may be a RAID device in which storage node 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage node 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage node 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of automatic security mitigation process 10. The instruction sets and subroutines of automatic security mitigation process 10, which may be stored on a storage device (e.g., storage device 16) coupled to storage node 100, may be executed by one or more processors (not shown) and one or more memory architectures (not shown) included within storage node 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of automatic security mitigation process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage node 100 is configured as an application server, these IO requests may be internally generated within storage node 100. Examples of IO request 20 may include but are not limited to data write request 116 (e.g., a request that content 118 be written to storage system 12) and data read request 120 (i.e., a request that content 118 be read from storage system 12).

During operation of storage node 100, content 118 to be written to storage system 12 may be processed by storage node 100. Additionally/alternatively and when storage node 100 is configured as an application server, content 118 to be written to storage system 12 may be internally generated by storage node 100.

Storage node 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage node 100 may initially store content 118 within frontend cache memory system 122. Depending upon the manner in which frontend cache memory system 122 is configured, storage node 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of automatic security mitigation process 10, which may be stored on storage device 16 included within storage system 12, may be executed by one or more processors (not shown) and one or more memory architectures (not shown) included within storage system 12. Accordingly, in addition to being executed on storage node 100, some or all of the instruction sets and subroutines of automatic security mitigation process 10 may be executed by one or more processors (not shown) and one or more memory architectures (not shown) included within data array 112.

Further and as discussed above, during the operation of data array 112, content (e.g., content 118) to be written to data array 112 may be received from storage node 100 and initially stored within backend cache memory system 124 prior to being stored on e.g., one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage nodes 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage node 124 may function like storage node 100. For example, during operation of storage node 124, content 118 to be written to storage system 12 may be processed by storage node 124. Additionally/alternatively and when storage node 124 is configured as an application server, content 118 to be written to storage system 12 may be internally generated by storage node 124.

Storage node 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage node 124 may initially store content 118 within frontend cache memory system 124. Depending upon the manner in which frontend cache memory system 126 is configured, storage node 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage node 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage node 124 and initially stored within backend cache memory system 124 prior to being stored on e.g., one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage node 100 and storage node 124 may be configured in an active/active configuration where processing of data by one storage node may be synchronized to the other storage node. For example, data may be synchronized between each storage node via a separate link or connection (e.g., connection 128). In some implementations, a storage cluster may be formed with several pairs of storage nodes (e.g., four pairs of storage nodes) configured to process data between each storage node of the storage cluster.

The Automatic Security Mitigation Process

Figure 3:
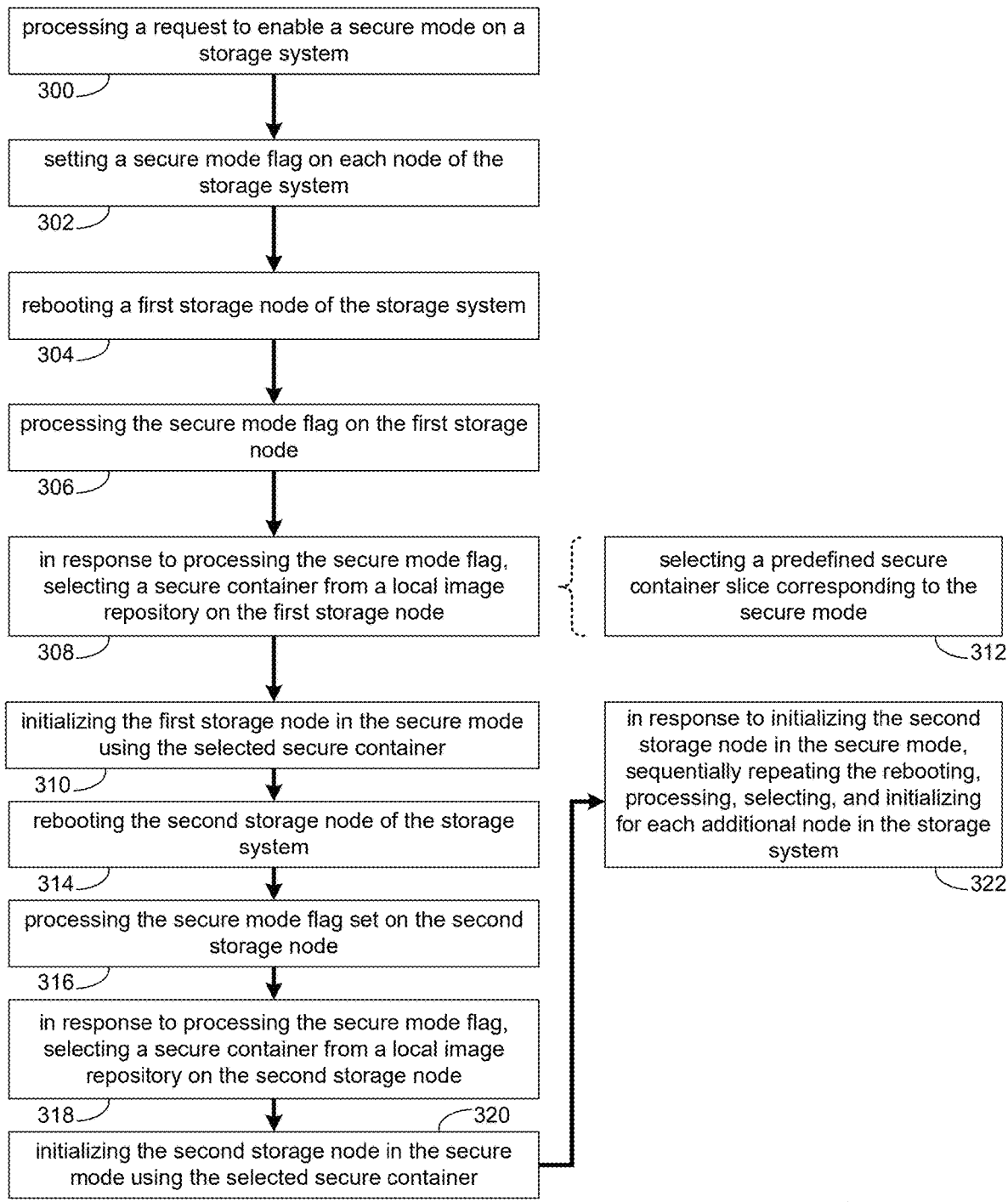
FIG. 3 is an example flowchart of the automatic security mitigation process according to one or more example implementations of the disclosure.
Figure 4:
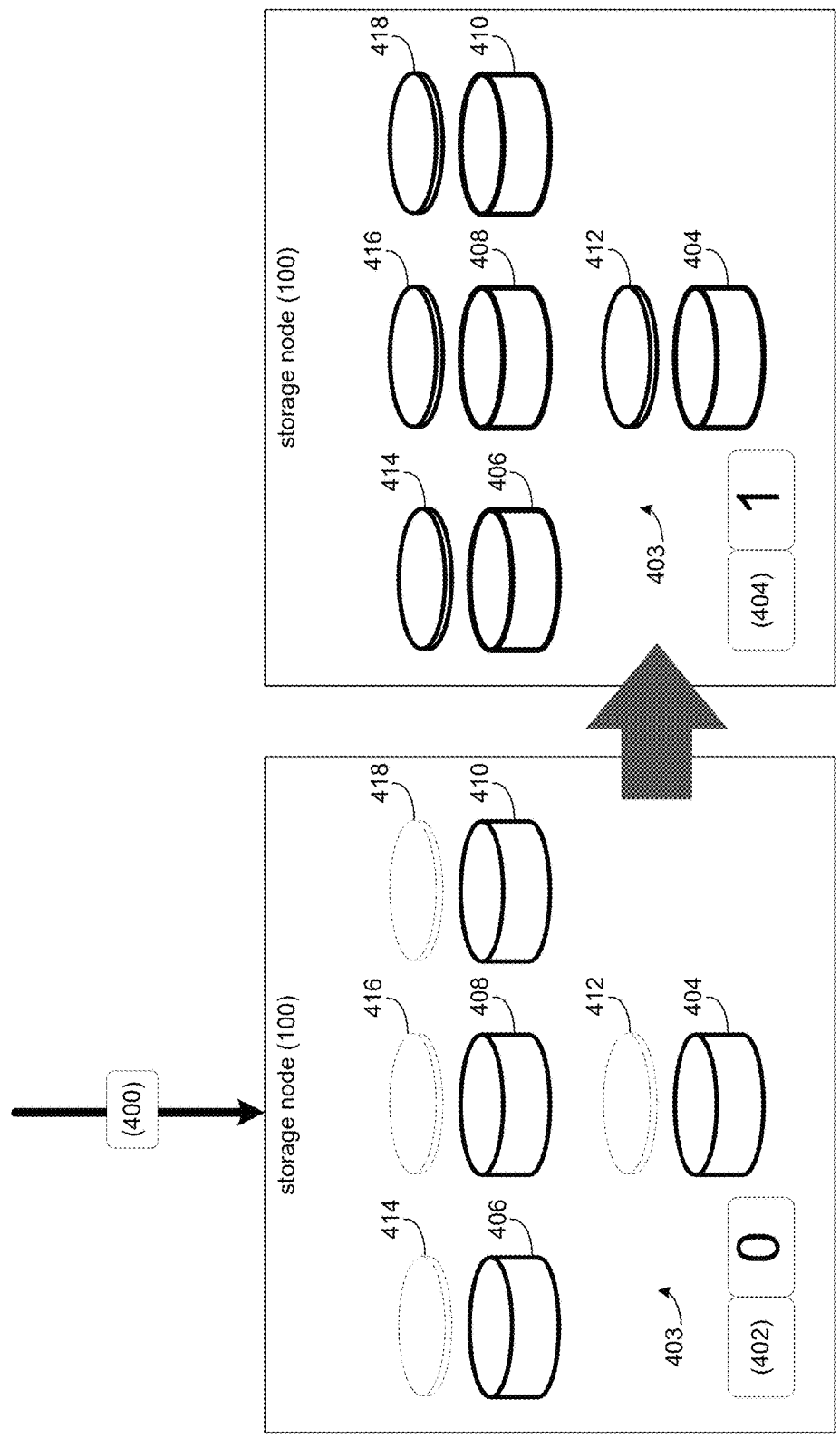
FIG. 4 is an example diagrammatic view of the automatic security mitigation process on a first storage node according to one or more example implementations of the disclosure.
Figure 5:
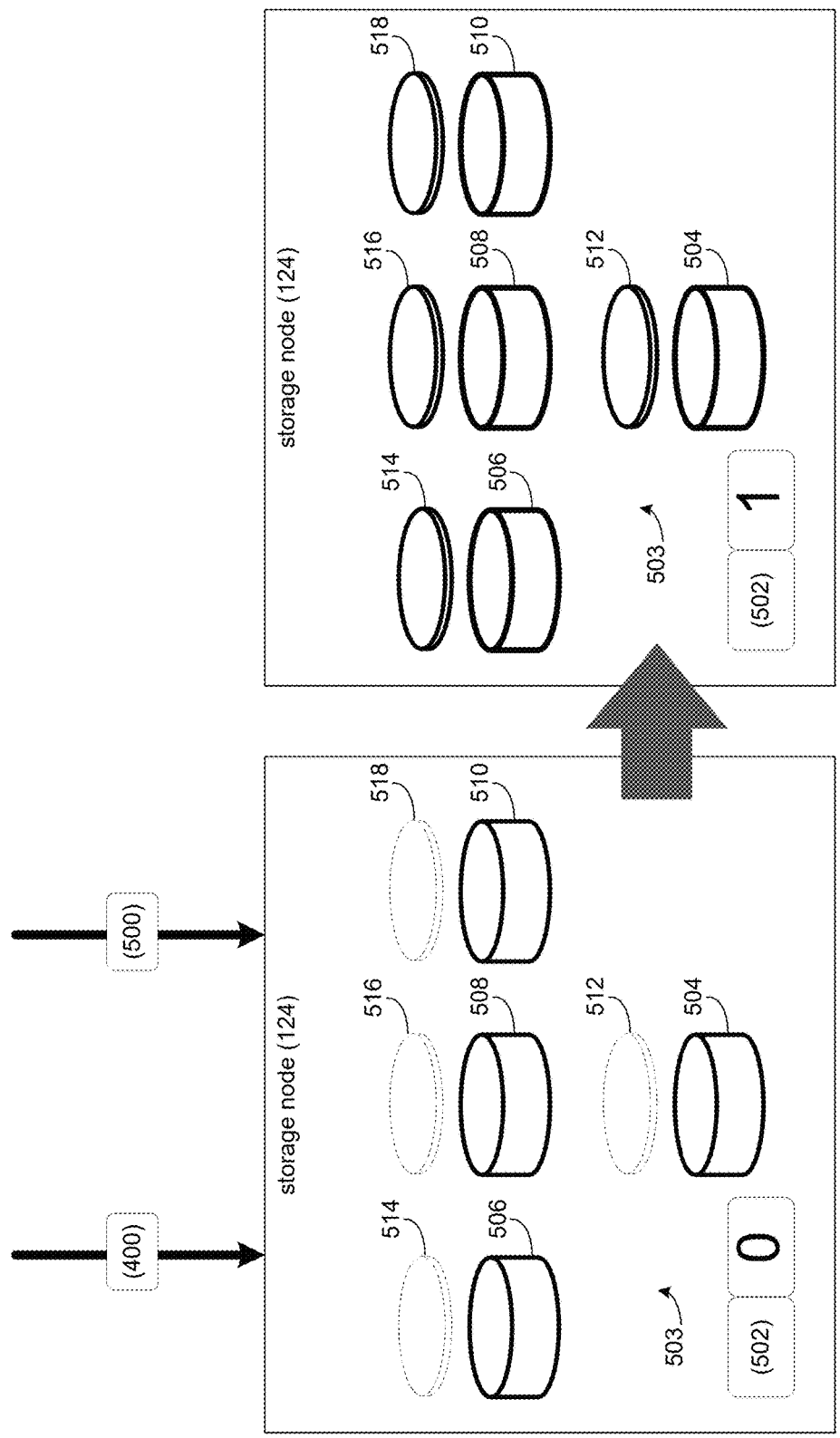
FIG. 5 is an example diagrammatic view of the automatic security mitigation process on a second storage node according to one or more example implementations of the disclosure.

Referring also to the examples of FIGS. 3-5 and in some implementations, automatic security mitigation process 10 may process 300 a request to enable a secure mode on a storage system. A secure mode flag on each node of the storage system is set 302. A first storage node of the storage system may be rebooted 304. The secure mode flag on the first storage node may be processed 306. In response to processing the secure mode flag, a secure container may be selected 308 from a local image repository on the first storage node and the first storage node may be initialized 310 in the secure mode using the selected secure container.

As will be discussed in greater detail below, implementations of the present disclosure may allow for storage systems to be adapted in future releases if the requirements for securing or hardening a storage system change, or if new components are added that also need to be adapted to raise their security posture. For example, automatic security mitigation process 10 provides a secure mode framework to apply secure mode (i.e., STIG)-specific settings across cluster nodes and across upgrades to a newer version. The framework stores the software for components in two forms, one with a unique set of secure mode (e.g., STIG hardening) changes already applied and one without (e.g., for a default mode). The framework controls which form of each component to use and easily transitions the system to use the components necessary to meet the increased security posture in a controlled and non-disruptive manner. As will be discussed below, each storage node within the scope of the present disclosure may be equipped with an image repository with multiple versions of some containers. In response to processing a secure mode flag, a secure container is selected from the local image repository and the first storage node is initialized to run this secure container.

In some implementations, automatic security mitigation process 10 processes 300 a request to enable a secure mode on a storage system. For example and as described above, storage system 12 may be a multi-node storage system including a first storage node (e.g., storage node 100) and at least a second storage node (e.g., storage node 124). In this example, storage nodes 100, 124 work in an active/active configuration where processing of data by one storage node may be synchronized to the other storage node. Referring also to FIG. 4 and in some implementations, automatic security mitigation process 10 may receive a request (e.g., request 400) to enable a secure mode on storage system 12. In this example, request 400 may be provided by a host device (e.g., client electronic device 38), another computing device, and/or another storage system. A secure mode is a configuration of the storage system to mitigate security issues. For example, during secure mode, data security procedures may be enhanced, communications to and from storage system 12 may be secured by encryption or advanced logging, and/or permissions associated with reading and/or writing data to storage system 12 may be limited to particular users, hosts, storage nodes, etc. Processing 300 request 400 to enable a secure mode may include verifying request 400 and providing a notification to any host devices communicating with storage system 12. For example and as will be discussed in greater detail below, because enabling the secure mode may include rebooting each storage node with a secure configuration of various software components, automatic security mitigation process 10 may process 300 request 400 by providing a notification of the timeline for enabling secure mode and the lack of access during the rebooting. In some implementations, processing 300 request 400 may provide a storage administrator with a final confirmation (e.g., by sending a confirmation request to a storage administrator to proceed with enabling secure mode). In some implementations and during the processing 300 of request 400, automatic security mitigation process 10 performs one or more storage system performance and health checks to confirm the operational state of the storage system before entering secure mode.

In some implementations, when enabling secure mode, automatic security mitigation process 10 may reconfigure hardware and/or software components of the storage system to meet predefined security standards. For example, automatic security mitigation process 10 may initialize different components or settings for various hardware and/or software components when in secure mode.

In some implementations, the secure mode is defined by a Security Technical Implementation Guide (STIG). As discussed above, the Defense Information Systems Agency (DISA) is responsible for maintaining the security posture of the Department of Defense (DoD) IT infrastructure. DISA creates Security Requirement Guides (SRGs) and "STIGs"—Security Technical Implementation Guides. These requirements encompass two areas—policy requirements for security programs and best practices for Information Assurance (IA)-enabled applications. STIGs are essentially alternate configurations that make commonly used applications more secure. All DoD IT assets must meet STIG compliance in some fashion before they are allowed to operate on DoD networks. Changing the configurations in compliance with the STIG requirements, often referred to as STIG hardening, allows a product to meet the unique requirements of the DoD market. A specific product will have a set of STIGs applicable depending on the functional components that are present, such as operating system, network stack and web server implementations. Application of the mitigations to meet the STIGs raises the security posture of the components in the product to meet the relevant security requirements. While an example of STIGs has been provided describing the nature of the secure mode, it will be appreciated that other types of security settings may be used within the scope of the present disclosure.

In some implementations, automatic security mitigation process 10 sets 302 a secure mode flag on each node of the storage system. For example, each storage node may include a secure mode flag (e.g., secure mode flag 402) that indicates the status of the operating mode for the storage node. In one example, each storage node may operate in a default mode or a secure mode. However, it will be appreciated that various other modes may be used within the scope of the present disclosure. A default mode may indicate a standard configuration for various hardware and/or software components of the storage node. In some implementations, the default mode may indicate the standard security configuration for various hardware and/or software components. Setting 302 secure mode flag 402 may include changing the value of secure mode flag from "0" associated with default mode to "1" associated with secure mode. However, it will be appreciated that various values for secure mode flag 402 may be used within the scope of the present disclosure (e.g., Boolean values, "Yes" or "No", "default" or "secure", etc.).

In some implementations, automatic security mitigation process 10 reboots 304 a first storage node of the storage system. For example and referring again to FIG. 4, during a default mode, automatic security mitigation process 10 uses default configurations for hardware and/or software components. Accordingly, to transition from the default mode to the secure mode, automatic security mitigation process 10 reboots 304 or restarts the first storage node (e.g., storage node 100) as shown in the transition following the arrow from the left portion of FIG. 4 to the right portion of FIG. 4.

In some implementations, automatic security mitigation process 10 processes 306 the secure mode flag on the first storage node. For example, after rebooting 304 storage node 100, automatic security mitigation process 10 processes 306 secure mode flag 402 by reading the value set for secure mode flag 402. Suppose that automatic security mitigation process 10 processes 306 secure mode flag 402 and determines that the secure mode flag is not set (e.g., value is "0" indicating no request to secure mode). In the example of FIG. 4, automatic security mitigation process 10 processes 306 secure mode flag 402 and determines that the secure mode flag is set (e.g., value is "1" indicating a request to enable secure mode). In some implementations, processing 306 the secure mode flag is performed during each reboot to determine whether the storage node is rebooted in secure mode or a default mode. As will be discussed in greater detail below, if the secure mode flag is set, automatic security mitigation process 10 selects a secure container for initializing the storage node in a secure mode. If the secure mode flag is not set, automatic security mitigation process 10 selects a default container for initializing the storage node.

In some implementations and in response to processing the secure mode flag, automatic security mitigation process 10 selects 308 a secure container from a local image repository on the first storage node. For example, a local image repository is a portion of memory within the storage node that defines configuration files or configuration data concerning different modes of a storage node. As shown in FIG. 4, automatic security mitigation process 10 includes a local image repository (e.g., local image repository 403) with a plurality of containers or container images (e.g., containers 404, 406, 408, 410) associated with a plurality of hardware and/or software components. In some implementations, the local image repository on the first storage node includes a set of default container images corresponding to a default mode. For example, container 404, 406, 408, 410 may include a default configuration for respective hardware and/or software components. Examples of containers include a base container (e.g., container 406), a service container (e.g., container 408), a control path container (e.g., container 410), etc. However, it will be appreciated that various containers may include various configuration files or configuration for different hardware and/or software components within the scope of the present disclosure. As shown in the left portion of FIG. 4, default configuration images are initialized in default mode such that hardware and/or software components are using a default configuration.

In response to processing 306 secure mode flag 402, automatic security mitigation process 10 may select 308 the secure container (or set of secure containers) from the local image repository on the first storage node by selecting 312 the containers built with predefined secure slices corresponding to the secure mode. For example and as shown in FIG. 4, default containers 404, 406, 408, 410 may include a predefined secure container slice corresponding to the secure mode for each configuration container (e.g., predefined secure container slice 412 for container 404; predefined secure container slice 414 for container 406; predefined secure container slice 416 for container 408; and predefined secure container slice 418 for container 410). In this example, when automatic security mitigation process 10 reboots 304 storage node 100, automatic security mitigation process 10 selects 312 the container built with the additional secure slice corresponding to the secure mode (e.g., predefined secure container slice 412) rather than default container 404; the container built with the additional secure container slice corresponding to the secure mode (e.g., predefined secure container slice 414) rather than default container 406; the container built with the additional secure slice corresponding to the secure mode (e.g., predefined secure container slice 416) rather than default container 408; and the container built with the additional secure slice corresponding to the secure mode (e.g., predefined secure container slice 418) rather than default container 410. As described above, each secure container is built by adding the predefined secure container slice on top of the same, default container. As both the default container images and the additional predefined secure container slice are delivered in the local image repository, automatic security mitigation process 10 can select between the default container and the secure container by selecting the default container images or the predefined secure container slice with the secure mode settings (e.g., STIG settings).

In some implementations, automatic security mitigation process 10 has access to both default configurations and secure configurations by accessing containers 404, 406, 408, 410 and, when secure mode flag 402 is set, by accessing predefined secure container slices 412, 414, 416, 418. In this manner, each storage node (e.g., storage nodes 100, 124) can enable default mode and secure mode as requested. Accordingly, automatic security mitigation process 10 allows a storage system to automatically enter a secure mode using secure configurations of hardware and/or software components by initializing predefined secure container slices 412, 414, 416, 418.

In some implementations, automatic security mitigation process 10 initializes 310 the first storage node in the secure mode using the selected secure container. For example, initializing 310 the first storage node (e.g., storage processor 100) may include using predefined secure container slices 412, 414, 416, 418 to determine the settings, constraints, etc. for each hardware and/or software component for which predefined secure container slices 412, 414, 416, 418 are defined. As discussed above, predefined secure container slices 412, 414, 416, 418 may define particular constraints and settings that limit access to or provide certain security or data security enhancements for data stored in storage system 12 and accessed using storage node 100. Accordingly, once initialized with predefined secure container slices 412, 414, 416, 418, storage node 100 is operating in secure mode.

In some implementations and in response to initializing the first storage node in the secure mode, automatic security mitigation process 10 reboots 314 the second storage node of the storage system, processes 316 the secure mode flag set on the second storage node, selects 318 a secure container from a local image repository on the second storage node in response to processing the secure mode flag, and initializes 320 the second storage node in the secure mode using the selected secure container. For example and referring also to FIG. 5, in response to initializing 310 storage node 100, automatic security mitigation process 10 provides a notification (e.g., notification 500) to storage node 124 indicating that storage node 124 is authorized to enable secure mode. In this example, automatic security mitigation process 10 reboots 314 storage node 124 (by transitioning following the arrow from the left side of FIG. 5 to the right side of FIG. 5) and processes 316 a secure mode flag (e.g., secure mode flag 502) associated with storage node 124. As secure mode flag 502 is set, automatic security mitigation process 10 selects the set of secure containers from the local image repository (e.g., local image repository 503) on storage node 124. As shown in FIG. 5 and as with storage node 100, local image repository 503 on storage node 124 includes a plurality of containers (e.g., containers 504, 506, 508, 510) associated with a plurality of hardware and/or software components. Additionally, containers 504, 506, 508, 510 are rebuilt to include a predefined secure container slice corresponding to the secure mode for each default image container (e.g., default container 504 is rebuilt to include predefined secure container slice 512; default container 506 is rebuilt to include predefined secure container slice 514; default container 508 is rebuilt to include predefined secure container slice 516; and default container 510 is rebuilt to include predefined secure container slice 518). In this example, when automatic security mitigation process 10 reboots 314 storage node 124, automatic security mitigation process 10 selects 318 predefined secure container slice 512 from local image repository 503 rather than default container 504; predefined secure container slice 514 from local image repository 503 rather than default container 506; predefined secure container slice 516 from local image repository 503 rather than default container 508; and predefined secure container slice 518 from local image repository 503 rather than default container 510. Automatic security mitigation process 10 initializes 320 storage node 124 using predefined secure container slices 512, 514, 516, 518. As discussed above, predefined secure container slices 512, 514, 516, 518 may define particular constraints and settings that limit access to or provide certain security or data security enhancements for data stored in storage system 12 and accessed using storage node 124. Accordingly, once initialized with predefined secure container slices 512, 514, 516, 518, storage node 124 is operating in secure mode.

In some implementations and in response to initializing the second storage node in the secure mode, automatic security mitigation process 10 sequentially repeats 322 the rebooting, processing, selecting, and initializing for each additional node in the storage system. For example, suppose storage system 12 is a multi-node storage system with more than two storage nodes. In this example, sequentially repeats 322 the rebooting, processing, selecting, and initializing for each additional node in the storage system. In some implementations, where the multi-node storage system includes a "primary" storage node and a plurality of "secondary" storage nodes. In this example, automatic security mitigation process 10 performs the above process of rebooting, selecting predefined secure container slices, and initializing on the secondary storage nodes first. Automatic security mitigation process 10 then performs the above actions on the primary storage node last. In some implementations and in response to repeating 322 the above-noted actions on each storage node, automatic security mitigation process 10 applies cluster-wide settings concerning the secure mode. In this manner, each storage node is individually configured into secure mode as described above and the storage cluster is configured to operate in the secure mode with cluster-wide settings.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    processing a request to enable a secure mode on a storage system;
    setting a secure mode flag on each node of the storage system;
    rebooting a first storage node of the storage system;
    processing the secure mode flag on the first storage node;
    in response to processing the secure mode flag, selecting a secure container from a local image repository on the first storage node; and
    initializing the first storage node in the secure mode using the selected secure container.

2. The computer-implemented method of claim 1, wherein the secure mode is defined by a Security Technical Implementation Guide (STIG).

3. The computer-implemented method of claim 1, wherein the local image repository on the first storage node includes a default image corresponding to a default mode.

4. The computer-implemented method of claim 1, wherein selecting the secure container from the local image repository on the first storage node includes selecting a predefined secure container slice corresponding to the secure mode.

5. The computer-implemented method of claim 1, wherein the storage system is a multi-node storage system including the first storage node and at least a second storage node.

6. The computer-implemented method of claim 5, further comprising:
    in response to initializing the first storage node in the secure mode:
    rebooting the second storage node of the storage system;
    processing the secure mode flag set on the second storage node;
    in response to processing the secure mode flag, selecting a secure container from a local image repository on the second storage node; and
    initializing the second storage node in the secure mode using the selected secure container.

7. The computer-implemented method of claim 6, further comprising:
    in response to initializing the second storage node in the secure mode, sequentially repeating the rebooting, processing, selecting, and initializing for each additional node in the storage system.

8. A computer program product residing on a non-transitory computer readable medium having a plurality of instructions stored thereon which, when executed by a processor, cause the processor to perform operations comprising:
    processing a request to enable a secure mode on a storage system;
    setting a secure mode flag on each node of the storage system;
    rebooting a first storage node of the storage system;
    processing the secure mode flag on the first storage node;
    in response to processing the secure mode flag, selecting a secure container from a local image repository on the first storage node; and
    initializing the first storage node in the secure mode using the selected secure container.

9. The computer program product of claim 8, wherein the secure mode is defined by a Security Technical Implementation Guide (STIG).

10. The computer program product of claim 8, wherein the local image repository on the first storage node includes a default image corresponding to a default mode.

11. The computer program product of claim 8, wherein selecting the secure container from the local image repository on the first storage node includes selecting a predefined secure container slice corresponding to the secure mode.

12. The computer program product of claim 8, wherein the storage system is a multi-node storage system including the first storage node and at least a second storage node.

13. The computer program product of claim 12, wherein the operations further comprise:

in response to initializing the first storage node in the secure mode:
rebooting the second storage node of the storage system;
processing the secure mode flag set on the second storage node;
in response to processing the secure mode flag, selecting a secure container from a local image repository on the second storage node; and
initializing the second storage node in the secure mode using the selected secure container.

14. The computer program product of claim 13, in response to initializing the second storage node in the secure mode, sequentially repeating the rebooting, processing, selecting, and initializing for each additional node in the storage system.

15. A computing system comprising:
a memory; and
a processor configured to process a request to enable a secure mode on a storage system, to set a secure mode flag on each node of the storage system, to reboot a first storage node of the storage system, to process the secure mode flag on the first storage node, in response to processing the secure mode flag, to select a secure container from a local image repository on the first storage node, and to initialize the first storage node in the secure mode using the selected secure container.

16. The computing system of claim 15, wherein the secure mode is defined by a Security Technical Implementation Guide (STIG).

17. The computing system of claim 15, wherein the local image repository on the first storage node includes a default image corresponding to a default mode.

18. The computing system of claim 15, wherein selecting the secure container from the local image repository on the first storage node includes selecting a predefined secure container slice corresponding to the secure mode.

19. The computing system of claim 15, wherein the storage system is a multi-node storage system including the first storage node and at least a second storage node.

20. The computing system of claim 19, wherein the processor is further configured to:
in response to initializing the first storage node in the secure mode:
rebooting the second storage node of the storage system;
processing the secure mode flag set on the second storage node;
in response to processing the secure mode flag, selecting a secure container from a local image repository on the second storage node; and
initializing the second storage node in the secure mode using the selected secure container.

* * * * *